United States Patent
Kim et al.

(10) Patent No.: US 12,556,996 B2
(45) Date of Patent: Feb. 17, 2026

(54) COMMUNICATION CLASS AWARE IDLE MODE CELL RESELECTION

(71) Applicant: Sprint Spectrum LP, Overland Park, KS (US)

(72) Inventors: Yun Sung Kim, Ashburn, VA (US); Pinalkumari Tailor, Ashburn, VA (US); Minho Song, Ashburn, VA (US); Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/440,117

(22) Filed: Feb. 13, 2024

(65) Prior Publication Data

US 2024/0214898 A1 Jun. 27, 2024

Related U.S. Application Data (63) Continuation of application No. 16/777,140, filed on Jan. 30, 2020, now abandoned.

(51) Int. Cl.
*H04W 36/30* (2009.01)
*H04W 28/02* (2009.01)
*H04W 36/08* (2009.01)
*H04W 68/00* (2009.01)
*H04W 92/10* (2009.01)

(52) U.S. Cl.
CPC ....... *H04W 36/30* (2013.01); *H04W 28/0268* (2013.01); *H04W 36/08* (2013.01); *H04W 68/005* (2013.01); *H04W 92/10* (2013.01)

(58) Field of Classification Search
CPC . H04W 36/08; H04W 36/30; H04W 28/0268; H04W 68/005; H04W 36/00224
See application file for complete search history.

(56) References Cited

U.S. PATENT DOCUMENTS

| | | | |
|---|---|---|---|
| 10,009,819 B2 | 6/2018 | Khay-Ibbat et al. | |
| 2015/0223117 A1* | 8/2015 | Jha | H04W 36/0016 455/436 |
| 2015/0327133 A1 | 11/2015 | Mu et al. | |
| 2015/0358477 A1* | 12/2015 | Jeong | H04M 15/56 370/259 |
| 2018/0152865 A1* | 5/2018 | Atri | H04W 36/00224 |
| 2019/0141598 A1 | 5/2019 | Leung et al. | |
| 2020/0236731 A1* | 7/2020 | Jung | H04W 76/10 |
| 2021/0153068 A1 | 5/2021 | Zee et al. | |

\* cited by examiner

*Primary Examiner* — Margaret G Webb
(74) *Attorney, Agent, or Firm* — Jones Robb, PLLC (57) ABSTRACT

A system may include an access node to deploy a radio air interface to provide wireless services to one or more wireless devices. The access node may include processing circuitry configured to periodically transmit a system information broadcast. The system information broadcast may include idle-mode cell reselection thresholds, which may include a set of general cell reselection thresholds and a set of communication-class-specific cell reselection thresholds. The processing circuitry may also periodically transmit a paging broadcast including paging messages for pending communications. One of the paging messages may include information identifying a class of the corresponding pending communication. During cell reselection, a device may determine which of the idle-mode cell reselection thresholds should be used based on which class (if any) is specified in a corresponding paging message.

18 Claims, 7 Drawing Sheets

COMMUNICATION CLASS AWARE IDLE MODE CELL RESELECTION

This patent application is a continuation of U.S. patent application Ser. No. 16/777,140, filed on Jan. 31, 2020, which is incorporated by reference in its entirety for all purposes.

TECHNICAL BACKGROUND

A wireless network, such as a cellular network, may include one or more access nodes (e.g., base stations) to wirelessly communicate with one or more wireless devices (also known as user equipment (UE)), for example via radio frequency transmissions. An access node may provide one or more cells that the wireless devices may connect to for wireless communications, with each cell corresponding to a frequency band and a radio access technology (RAT) and having a corresponding coverage area. Some wireless networks may utilize multiple frequency bands and/or multiple radio access technologies (RAT) for wireless communications. In some networks, cells having different frequency bands and/or different RATs may have the same or overlapping coverage areas.

Because there may be multiple cells capable of communicating with a wireless device at a particular location, a wireless device may need to select which one of the cells it should connect to. For example, a wireless device that is in an idle mode may determine which cell that it will connect to when it transitions to a connected or active mode. The process of an idle mode device selecting a cell to connect to may be referred to as "cell reselection." As another example, a wireless device that is in a connected or active mode may occasionally change which cell it is connected to. The process of selecting a new cell for a wireless device that is in connected or active mode may be referred to as a "handover" or "handoff."

The processes of selecting the cell that a wireless device should connect to may involve measuring the strengths of radio signals received from the various cells by the wireless device and applying various selection criteria based on parameters and thresholds specified by the network. A wireless device in idle mode may periodically wake up to make the measurements of received signals and to perform the cell reselection process. For a wireless device in connected mode, the access node may participate in and/or control the handover processes. In some networks, the processes for selecting a cell for connected mode devices (handovers) may involve different criteria, parameters, and/or thresholds than the processes for selecting a cell for idle mode devices (cell reselection).

Existing techniques for managing which cell a wireless device should connect to might not always yield desired results. For example, existing techniques may result in scenarios in which a wireless device in idle mode selects a first cell, thereafter transitions to connected (active) mode and connects to the first cell, and then immediately or shortly thereafter is handed over to a second cell. This scenario may be inefficient, as the processing and signaling overhead associated with the handover might have been avoided if the wireless device had connected to the second cell in the first place. Accordingly, examples disclosed herein may include improved techniques for managing which cell an idle-mode wireless device selects for establishing a connection, which may avoid or mitigate the wasteful handovers noted above.

OVERVIEW

Examples described herein include systems, methods, and processing nodes for enabling communication-class aware idle mode cell reselection. An example system described herein includes an access node configured to deploy a radio air interface to provide wireless services to one or more wireless devices. The access node includes processing circuitry configured to periodically transmit a system information broadcast. The system information broadcast includes idle-mode cell reselection thresholds including general cell reselection thresholds and communication-class-specific cell reselection thresholds. The processing circuitry is also configured to periodically transmit a paging broadcast including paging messages for pending communications. If one of the paging messages is for a pending communication that is of a particular class, the paging message includes information identifying the class of the pending communication.

An example method described herein for idle mode cell reselection includes periodically transmitting, by an access node configured to deploy a radio air interface to provide wireless services to one or more wireless devices, a system information broadcast that includes idle-mode cell reselection thresholds including general cell reselection thresholds and communication-class-specific cell reselection thresholds. The method further includes periodically transmitting, by the access node, a paging broadcast including paging messages for pending communications, wherein one of the paging messages is for a pending communication that is of a particular class and the paging message includes information identifying the class of the pending communication.

An example processing node described herein is configured to perform operations. The operations include periodically transmitting, by an access node configured to deploy a radio air interface to provide wireless services to one or more wireless devices, a system information broadcast that includes idle-mode cell reselection thresholds including general cell reselection thresholds and communication-class-specific cell reselection thresholds. The operations also include periodically transmitting, by the access node, a paging broadcast including paging messages for pending communications, receiving a request to establish a communication with an idle-mode wireless device, determining a class associated with the communication, and causing one of the paging broadcasts to include a paging message for the communication that includes information identifying the class of the communication.

DETAILED DESCRIPTION

Example embodiments described herein include systems, methods, and devices (e.g., processing nodes) for enabling communication-class aware idle mode cell reselection. The disclosed systems and methods may be implemented in any wireless networks in which idle mode wireless devices perform cell reselection.

As noted above, existing techniques for managing which cell a wireless device connects to can lead to wasteful handovers in some circumstances. An example of how such wasteful handovers might occur will be described below with reference to FIGS. 1A-1B, which illustrate coverage areas of two cells, Cell A and Cell B, of an example network. In the example, two different coverage areas are illustrated for each cell: one coverage area associated with idle mode selection thresholds and one coverage area associated with special handover thresholds for voice-over-LTE (VoLTE) communications. VoLTE is used in this explanation as an example of a class of communications that may have special handover thresholds that differ from the normal reselection thresholds, but it should be understood that the explanation also applies to other classes of communications that have special selection thresholds. VoLTE communications may have special handover thresholds because, for example, they may have specific quality-of-service (QOS) requirements that may differ from general data communication requirements. The two cells, Cell A and Cell B, may, for example, correspond to two LTE cells provided by the Access Node that have different frequency bands.

Figure 1A:
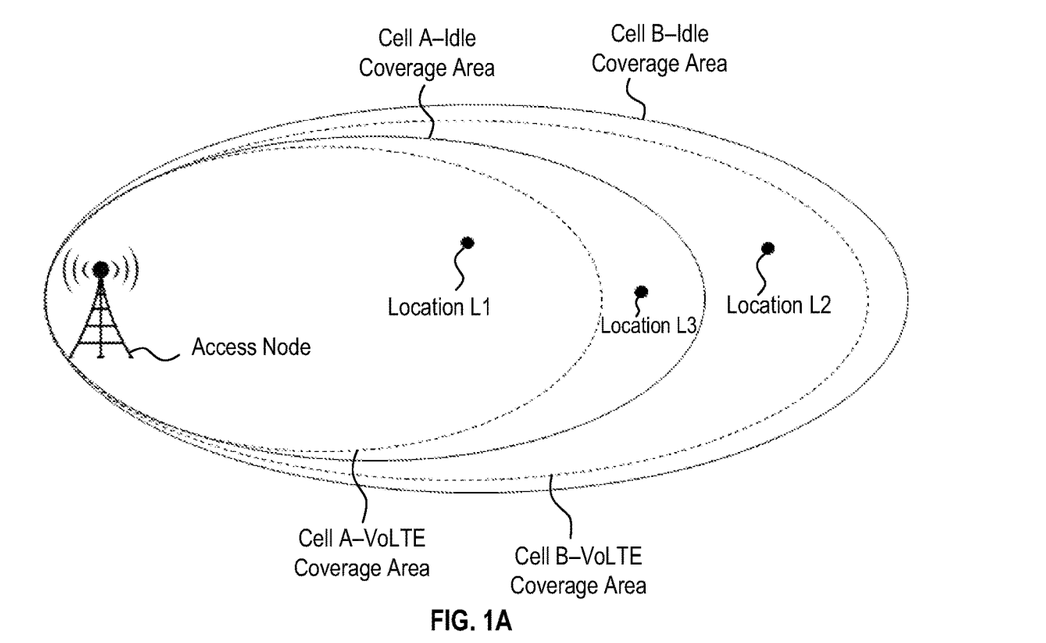
FIG. 1A depicts example coverage areas associated with example cells of an example access node.
Figure 1B:
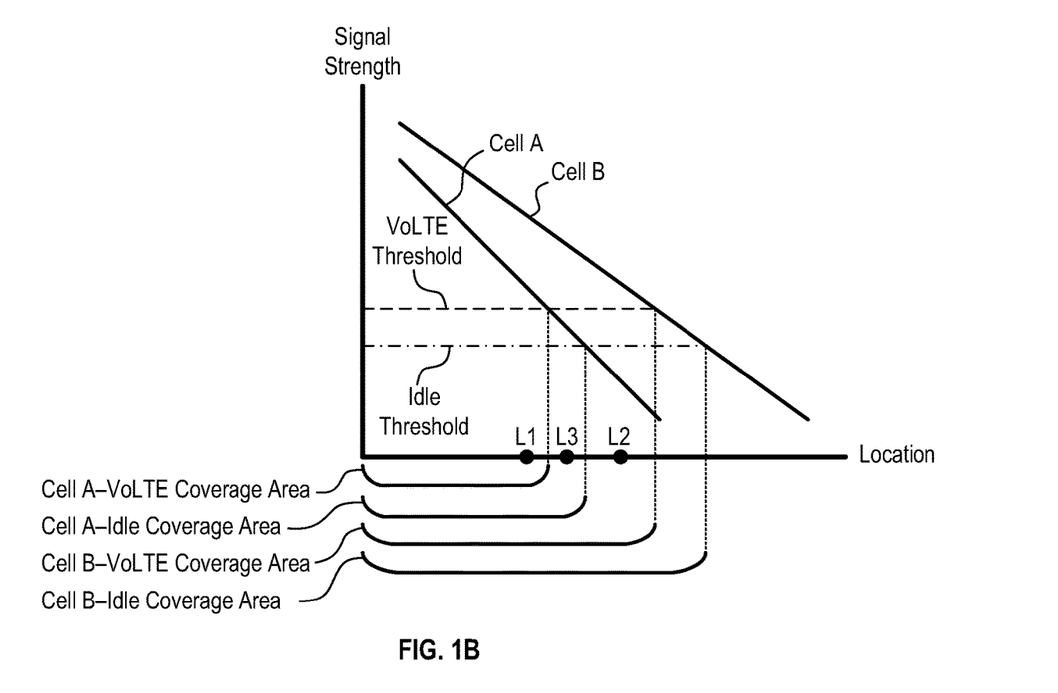
FIG. 1B depicts a graph of signal strength plotted against location for the example cells, as well as example signal strength thresholds and boundaries of the example coverage areas.

A wasteful handover may occur, for example, when a wireless device in idle mode ("idle mode wireless device") is paged to receive a communication that happens to be of a particular class that has special handover thresholds (e.g., an incoming VoLTE call) and the wireless device happens to be located in a region in which applying the special handover thresholds leads to a different cell selection than applying the idle mode cell reselection thresholds that are normally used. Such a region may be referred to herein as a "coverage mismatch" region. In FIGS. 1A and 1B, location L3 is in such a coverage mismatch region, namely the region that is within the Cell A Idle Coverage Area but outside of the Cell A VoLTE Coverage Area.

Using existing techniques, an idle-mode wireless device at location L3 will perform cell reselection using the standard cell reselection thresholds that are specified by the network and thus will select Cell A. The wireless device selects Cell A because it is within the Cell A Idle Coverage Area, and as shown in FIG. 1B, within this area the signal strength of Cell A exceeds the standard cell reselection thresholds. (The device is also within the Cell-B Idle Coverage Area, but in this example it is assumed that when both cells satisfy the selection criteria, Cell A is preferred over Cell B, and thus Cell A is selected.) Thus, when the idle-mode wireless device at location L3 is paged for an incoming VoLTE call, it will transition to connected (active) mode and connect to Cell A because that is the cell it selected during idle-mode cell reselection.

However, after connecting to cell A and initiating the VoLTE communication, the wireless device and/or the access node may apply the special VoLTE handover thresholds. Because the wireless device at location L3 is outside of the Cell A VoLTE Coverage Area and within the Cell B VoLTE Coverage Area (see FIG. 1A), the wireless device may be handed over to Cell B. In other words, at location L3 Cell A's signal strength is less than the VoLTE threshold while Cell B's signal strength exceeds the VoLTE thresholds (see FIG. 1B), and therefore a handover from Cell A to Cell B may occur. Thus, immediately or shortly after connecting to a first cell, the wireless device may be handed over to a different cell. This handover is wasteful because the processing and signaling overhead associated with it may have been avoided if the wireless device had selected Cell B in the first place.

Notice that at locations other than the coverage mismatch regions, such as at locations L1 and L2, the VoLTE-specific threshold voltages and the general idle-mode cell reselection result in selection of the same cell, and thus the wasteful handovers are less likely to occur at these locations.

Although the scenario described above involves selecting between two LTE cells having different frequency bands that are from the same access node, the principles also apply to other scenarios, such as selecting between cells from different access nodes or cells using other RATs or cells having the same frequency bands. Different types of thresholds and different selection criteria may be applied depending on the nature of the cells under consideration (e.g., inter-RAT thresholds, inter-frequency thresholds, intra-frequency thresholds, etc.). Speaking generally, such wasteful handovers may occur when there is a special set of handover thresholds that is associated with a particular class of communications and a different set of idle-mode cell reselection thresholds, where the two sets of thresholds result in selection of different cells.

Embodiments disclosed herein may avoid or mitigate such wasteful handovers, as described below with further reference to FIGS. 1A-1B. In embodiments disclosed herein, the access node may communicate to the idle-mode wireless devices a set of class-specific idle-mode cell reselection thresholds that may be associated with the particular class of communications that has the special handover thresholds (such as VoLTE calls). For example, the access node may periodically send out system information broadcasts which include information specifying communication-class-specific cell reselection thresholds for one or more classes of communications. Furthermore, in embodiments disclosed herein, when a pending communication for an idle-mode wireless device is of a class that has special thresholds associated therewith (such as VoLTE calls), the access node may communicate to the idle-mode wireless device information identifying the class of the incoming communication. For example, the access node may periodically send a paging broadcast to notify idle-mode wireless devices of pending connection requests, and the paging broadcast may include an indication of the class of communication being requested (at least when it is one of the classes that has special thresholds).

Thus, because the idle-mode wireless devices are made aware of the class of incoming communication that they are receiving and also of the class-specific reselection thresholds associated therewith, the wireless devices are enabled to use the appropriate class-specific reselection thresholds instead of the normal cell reselection thresholds. This may avoid the wasteful handovers described above. For example, let us reconsider the wireless device at location L3 in FIGS. 1A and 1B, but this time applying techniques disclosed herein. In such a scenario, the idle-mode wireless device receives VoLTE-specific cell reselection thresholds from the Access Node, for example via system information broadcasts. When the idle mode wireless device receives a paging broadcast, the wireless device may perform an idle-mode cell reselection process. Because the wireless device is aware that the pending communication is a VoLTE call (e.g., because the paging broadcast indicated a class of the pending communication), the wireless device knows that during the cell reselection process it should use the VoLTE-class-specific cell reselection thresholds that were previously communicated to it. Thus, applying the VoLTE specific thresholds at location L3, the wireless device selects to connect to cell B because the device is located outside of the VoLTE coverage area of cell A (the signal strength of Cell A is lower than the VoLTE-specific threshold). Thus, the wireless device connects directly to cell B as desired, avoiding the unnecessary and wasteful connection to cell A and subsequent handover to cell B.

Using the system information broadcasts to inform the idle-mode wireless devices of the class-specific reselection thresholds may be beneficial for a number of reasons. One such reason is that, in many networks, the system information broadcasts can be received by wireless devices that are in idle mode. This is not the case for many other messages, which can only be communicated to connected (active) mode wireless devices. For example, RRC Configuration or RRC Reconfiguration messages may be capable of communication with connected-mode wireless devices but not idle mode devices. If such connected-mode-only messages were used to communicate the communication-class-specific thresholds, then idle mode wireless devices would not know the thresholds unless they had previously connected to the network and received them. Moreover, even if the wireless devices had connected to the network to receive the special thresholds and thereafter transitioned to idle mode, the idle mode devices will not be able to become aware of changes to the thresholds that may have occurred since they last connected to the network. Such a change in thresholds could occur, for example, because the network may change the threshold dynamically based on changing network conditions, or because the idle-mode wireless device has moved into a different area in which different threshold values are used. The idle-mode wireless devices would not be aware of the changed threshold values because they do not receive the connected-mode messages that, in this scenario, are used to communicate the thresholds.

Another benefit of using the system information broadcasts to communicate the thresholds is that, in many systems, the network is already configured to generate system information broadcasts and the wireless devices are already configured to receive and process the system information broadcasts while in idle mode (e.g., they wake up at specified timings to listen for the broadcast). Thus, less reconfiguration and disruption to existing systems is needed in order to enable the information to be conveyed, as compared to an alternative approach of creating a new and distinct broadcast to convey the information.

Using the paging broadcast to inform the idle-mode wireless devices of the class of the communication may be beneficial for similar reasons. For example, like the system information broadcasts, the paging broadcasts can be received by wireless devices that are in idle mode. In addition, as with the system information broadcast, the wireless devices may already be configured to listen for the paging broadcasts.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The term "idle-mode cell reselection threshold" (or variants thereof, such as "reselection threshold") refers to a threshold that is to be used by an idle-mode wireless device when applying selection criteria during cell reselection.

The term "communication-class-specific cell reselection thresholds" (or variants thereof, such as "class-specific reselection thresholds") refers to idle-mode cell reselection threshold that are to be used by a wireless device specifically when a pending communication for the wireless device is of a particular class of communications that has special cell reselection thresholds that differ from general cell reselection thresholds.

The term "general cell reselection thresholds" (or variants thereof, such as "general reselection thresholds") refers to idle-mode cell reselection thresholds that are to be used when there is no pending communication for the wireless device, or when a pending communication for the device is not of the particular class that has the special class-specific cell reselection thresholds.

In some examples, the communication-class-specific cell reselection thresholds may be analogs to the general cell reselection thresholds. In this context, two thresholds being analogs means that they are used by the wireless device in the same or an analogous way during reselection (e.g., they are used as values of the same parameter in the same selection criteria). For example, if a given selection criteria compares a parameter $TH_i$ to some value, and if the value of $TH_i$ is selected from the set of thresholds $\{TH_0, TH_1, \ldots\}$, then the threshold values $\{TH_0, TH_1, \ldots\}$ are all analogs of one another. For convenience, subscripts may be used herein to distinguish different analogs, with the subscript indicating a class of communications associated with the threshold. Herein, general cell reselection thresholds may be dented using either no subscript or the subscript 0 (zero), while class-specific thresholds may be indicated by subscripts equal to or greater than 1.

The term "idle mode" refers to a mode of a wireless device in which communications between the access node and the wireless device are limited as compared to a connected (active mode). In idle mode, a wireless device may have reduced functionality and lower power consumption, for example. In some examples, an idle-mode wireless device does not receive unicast downlink communications from the network, and instead receives only broadcast transmissions. For example, an idle-mode wireless device may periodically wake to listen for network broadcasts (such as system information broadcasts and paging broadcasts) and perform other functions such as idle-mode cell reselection.

An example system described herein includes at least an access node (or base station), such as an eNodeB, a gigabit NodeB (gNodeB), and a plurality of end-user wireless devices. The system may also include a relay node in wireless communication with the access node and configured to relay data packets between the access node and an end-user wireless device served by the relay node.

Relay nodes may improve service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. The access node may be referred to as a "donor" access node. Relay nodes are generally configured to communicate with the "donor" access node via a wireless backhaul connection, and to deploy a radio air interface to which end-user wireless devices can attach. Donor access nodes generally include scheduling modules or schedulers for scheduling or allocating resources to wireless devices directly connected thereto, as well as to the relay nodes connected to the donor access nodes through the wireless backhaul connection.

For illustrative purposes and simplicity, the disclosed technology for communication class aware idle mode cell reselection will be illustrated and discussed as being implemented in the communications between an access node (e.g., a base station) and a wireless device (e.g., an end-user wireless device or a relay node). It is understood that the disclosed technology for communication class aware idle mode cell reselection may also be applied to communication between an end-user wireless device and a relay node. For example, the system information broadcasts and paging broadcasts discussed below as being transmitted by an access node may also be transmitted (or retransmitted) to the end-user wireless devices by relay node.

In addition to the systems and methods described herein, the operations for communication class aware idle mode cell reselection may be implemented as computer-readable instructions or methods, and processing nodes on the network for executing the instructions or methods. Such processing nodes may include a processor included in the access node, a processor included in a controller node in the wireless network that is coupled to the access node, or a processor included in a wireless device.

Figure 2:
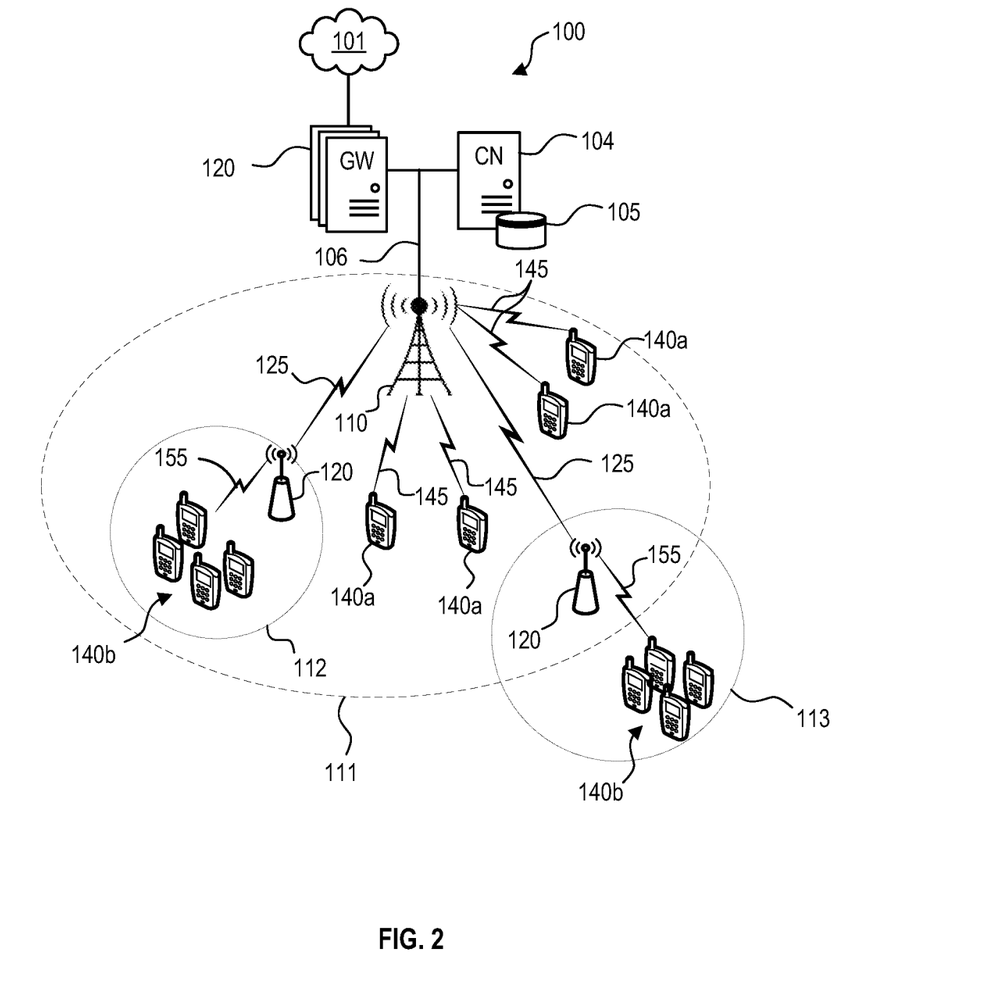
FIG. 2 depicts an example system for wireless communication.

FIG. 2 depicts an example system for wireless communication. System 100 may be a wireless communication network, such as a cellular network. System 100 may include a communication network 101, a gateway 102, a controller node 104, and an access node 110. Access node 110 may deploy a radio air interface serving one or more relay nodes 120 and one or more end-user wireless devices 140 (also referred to as "wireless devices 140"). One or more end-user wireless devices 140 may be directly connected to access node 110, such as end-user wireless devices 140a. One or more end-user wireless devices 140 may be indirectly connected to access node 110 through relay nodes 120, such as end-user wireless devices 140b. Hereinafter, for simplicity, the directly connected end-user wireless devices 140a and indirectly connected end-user wireless devices 140b are generally referred to as end-user wireless devices 140 or wireless devices 140.

In the example system 100 shown in FIG. 2, access node 110 may be a macro-cell access node configured to deploy a wireless radio air interface including one or more cells, each cell having a corresponding frequency band, a corresponding RAT, and a corresponding coverage area such as the coverage area 111 illustrated in FIG. 2. Each of the relay nodes 120 and each of the end-user wireless devices 140a may be attached to the wireless air interface deployed by access node 110. Relay nodes 120 may be configured to communicate with access node 110 over wireless communication links 125 (hereinafter, "wireless backhaul" or "backhaul"). Wireless links 125, as well as other wireless links 145 that directly couple end-user wireless devices 140a with access node 110, as shown in FIG. 2, form the wireless network (or wireless radio air interface) deployed by access node 110.

Relay nodes 120 may be further configured to deploy additional wireless radio air interfaces including one or more cells, each cell having a corresponding frequency band, a corresponding RAT, and a corresponding coverage area such as the coverage areas 112, 113 illustrated in FIG. 2. End-user wireless devices 140b may attach to a wireless radio air interface or link 155 deployed by a relay node 120. All of the end-user wireless devices 140b are indirectly attached to the wireless radio air interface deployed by access node 110 through the relay nodes 120.

In some embodiments, end-user wireless devices 140b may access network services using the combination of links 155 to relay nodes 120 and wireless backhaul links 125 to access node 110. In some embodiments, end-user wireless devices 140a may access network services by directly connecting to access node 110 via links 145. As shown in FIG. 2, some end-user wireless devices 140b may be located outside of a coverage area 111 of a cell of access node 110, but may nonetheless connect to the access node 110 by virtue of the relay 120 that is within the coverage area 111. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140 and a communication network 101, including standard access nodes such as a macro-cell access node, a base transceiver station, a radio base station, an eNodeB device, an enhanced eNodeB device, a gigabit NodeB (or gNodeB) in 5 New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that simultaneously supports multiple frequency bands selected from 3 GHz to 100 GHz. In an example embodiment, a macro-cell access node 110 may have a coverage area 111 in the range of approximately five kilometers to thirty-five kilometers and an output power in the tens of watts. Relay nodes 120 may include short range, low power, small-cell access nodes such as a microcell access node, a picocell access node, a femtocell access node, or a home eNodeB device. In addition, relay nodes 120 may include a small-cell access node paired with a relay wireless device configured to communicate over one of wireless backhaul links 125.

Access node 110 and relay nodes 120 may each include a processor and associated hardware circuitry configured to execute or direct the execution of computer-readable instructions to perform operations described herein. In some embodiments, access node 110 and relay nodes 120 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 may receive instructions and other input at a user interface. Access node 110 may communicate with gateway 102 and controller node 104 via a communication link 106. Access node 110 and relay nodes 120 may communicate with each other, and other access nodes (not shown), using a wireless link or a wired link such as an X2 link. Components of access node 110 and relay nodes 120 are further described below.

End-user wireless devices 140 may be any device, system, combination of devices, or other such communication platform configured to wirelessly communicate with access node 110 and/or relay nodes 120 using one or more frequency bands deployed therefrom. For example, end-user wireless devices 140 may include a mobile phone, a wireless phone, a wireless modem, a personal digital assistant (PDA), a voice over internet protocol (VOIP) phone, a voice over packet (VOP) phone, a soft phone, a computer, a tablet, a wearable smart device, an internet-of-things (IOT) device, as well as other types of devices or systems that may send and receive signals or data. Other types of communication platforms are contemplated.

The system 100 may use one or more wireless network protocols, such as one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). As noted above, the access node 110 may provide one or more cells, with each having a frequency band and a RAT. In some examples, the access node 110 provides multiple cells having multiple different frequency bands and/or multiple different RATs. In some examples, the frequency bands and/or RATs may be defined or specified by a wireless network protocol, such as those mentioned above, and/or by other governmental or industry bodies. For example, the access node 110 may include one or more cells using UMTS Terrestrial Radio Access (UTRA) (the RAT from the UMTS protocol), one or more cells using Evolved UTRA (E-UTRA) (the RAT from the LTE or LTE Advanced protocols), one or more cells using 5G NR, etc. For example, the access node 110 may include one or more cells using frequency bands as specified by UTRA, E-UTRA, 5G NR, etc.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by end-user wireless devices 140. Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an example embodiment, controller node 104 may include a database 105 configured for storing information related to elements within system 100, such as configurations and capabilities of relay nodes 120, resource requirements of end-user wireless devices 140, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 3:
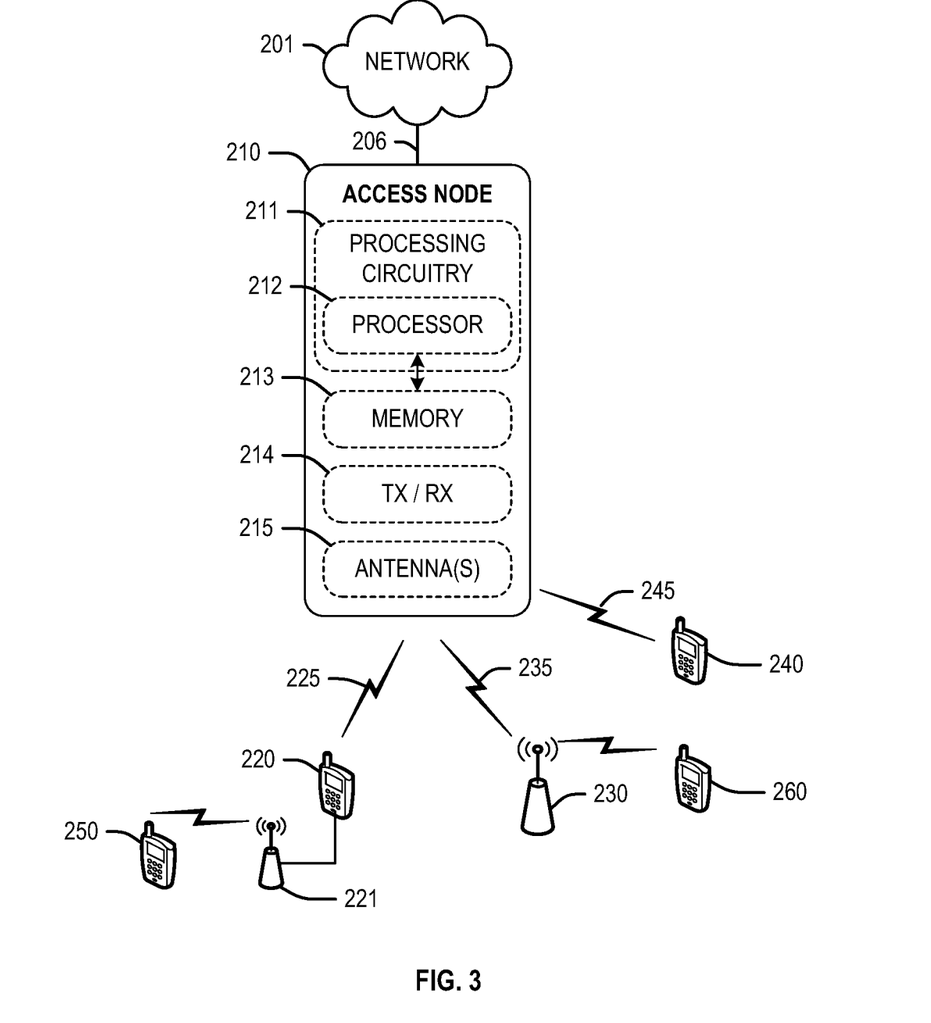
FIG. 3 depicts an example access node.

FIG. 3 depicts an example access node 210. Access node 210 may include, for example, a macro-cell access node. Access node 210 may be an embodiment of access node 110 described with reference to FIG. 2. Access node 210 may include processing circuitry 211 configured to perform various operations described herein. The processing circuitry 211 may include a processor 212, dedicated hardware (not illustrated), or any combination of these. Access node 210 may also include, a memory 213, one or more transceivers 214, and one or more antennas 215. Although the memory 213 is illustrated separate from the scheduler, in some examples the memory is part of the processing circuitry of the processing circuitry 211.

Processing circuitry 211 may be configured to schedule or allocate resources, including downlink and uplink resources, for wireless devices communicably coupled to the access node 210, such as relay nodes and/or end-user wireless devices that are directly connected with access node 210. In some embodiments, the processing circuitry 211 includes a processor 212 configured to execute instructions stored in memory 213. The memory 213 may store instructions for performing some or all of the operations disclosed herein. Thus, in some examples, the processing circuitry 211 is configured to perform various operations disclosed herein by virtue of the memory 213 storing instructions to perform those operations that can be accessed and executed by processor 212. The processor 212 may include any processing resource capable of executing machine readable instructions, such as, for example, a processor, a processor core, a central processing unit (CPU), a controller, a microcontroller, a system-on-chip (SoC), a digital signal processor (DSP), a graphics processing unit (GPU), etc. In some examples, the processing circuitry 211 may include dedicated hardware (not illustrated), in addition to or in lieu of the processor 212, to perform some or all of the operations described herein. Examples of such dedicated hardware may include an Application Specific Integrated Circuit (ASIC), a Field Programmable Gate Array (FPGA), a Complex Programmable Logic Device (CPLD), or the like.

Transceiver(s) 214 and antenna(s) 215 may be configured to provide an air interface to enable wireless communication with wireless devices, such as a relay wireless device 220, a relay node 230, and an end-user wireless device 240. The wireless interface provided may be provided via one or more cells, each having a corresponding frequency band, RAT, and coverage area. For example, the wireless radio interface may include wireless links 225 to communicate with relay may include wireless devices 220, wireless links 235 to communicate with relay nodes 230, and/or wireless links 240 to communicate with end-user wireless devices 240. The processing circuitry 211 may be configured to direct or control the transceiver(s) 214 in the deployment of the wireless radio air interface. In addition, the processing circuitry 211 may be configured to enable wireless devices, such as the relay wireless device 220, relay node 230, and end-user wireless devices 240, to access network services from a network 201 via access node 210. Network 201 may be similar to network 101 discussed above. The operations performed by processing circuitry 211 may further include enabling a relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node.

In FIG. 3 various components of the access node 210 are illustrated and described separately for convenience of description, but this should not be misunderstood as implying that these components are necessarily physically distinct. In other words, components that were illustrated and described separately may be embodied in the same underlying hardware. For example, the transceiver(s) 214 may be embodied, in whole or in part, in processor 212.

Figure 4:
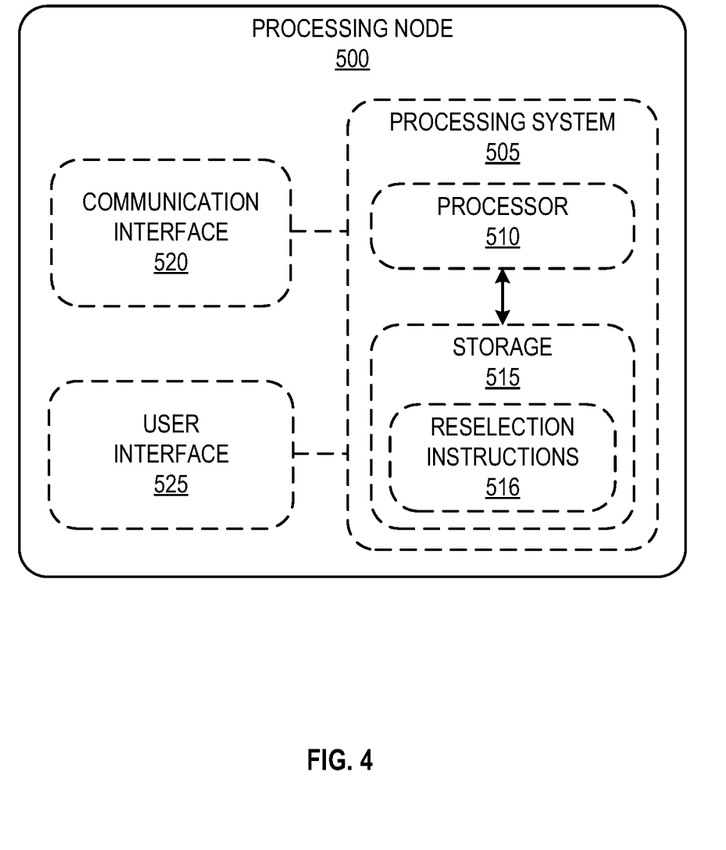
FIG. 4 depicts an example processing node.

FIG. 4 depicts an example processing node 500, which may be configured to perform some or all of the methods and operations disclosed herein for communication class aware idle mode cell reselection. In some embodiments, processing node 500 may be included in an access node, such as access node 110 or 210. In some embodiments, processing node 500 may be included in controller node 104, and may be configured for controlling the access nodes. In some embodiments, processing node 500 may be included in a wireless device, such as wireless device 140.

Processing node 500 may be configured for communication class aware idle mode cell reselection. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various operations or methods disclosed herein. Software stored in storage device 515 may include computer programs, firmware, or other form of machine-readable instructions, including an operating system, utilities, drivers, network interfaces, applications, or other type of software. For example, reselection instructions 516 may be stored in storage device 515 and may include instructions for performing various operations described herein, such as the operations described below in relation to methods 600, 700, and/or 800. Processor 510 may be a microprocessor and may include hardware circuitry and/or embedded codes configured to retrieve and execute software stored in storage device 515.

In examples in which the processing node 500 is included in the access node 210, the processing node 500 may be an embodiment of, may include, or may be included in, the processing circuitry 211. Furthermore, the processor 510 may be an embodiment of, may include, or may be included in, the processor 212.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

Figure 5:
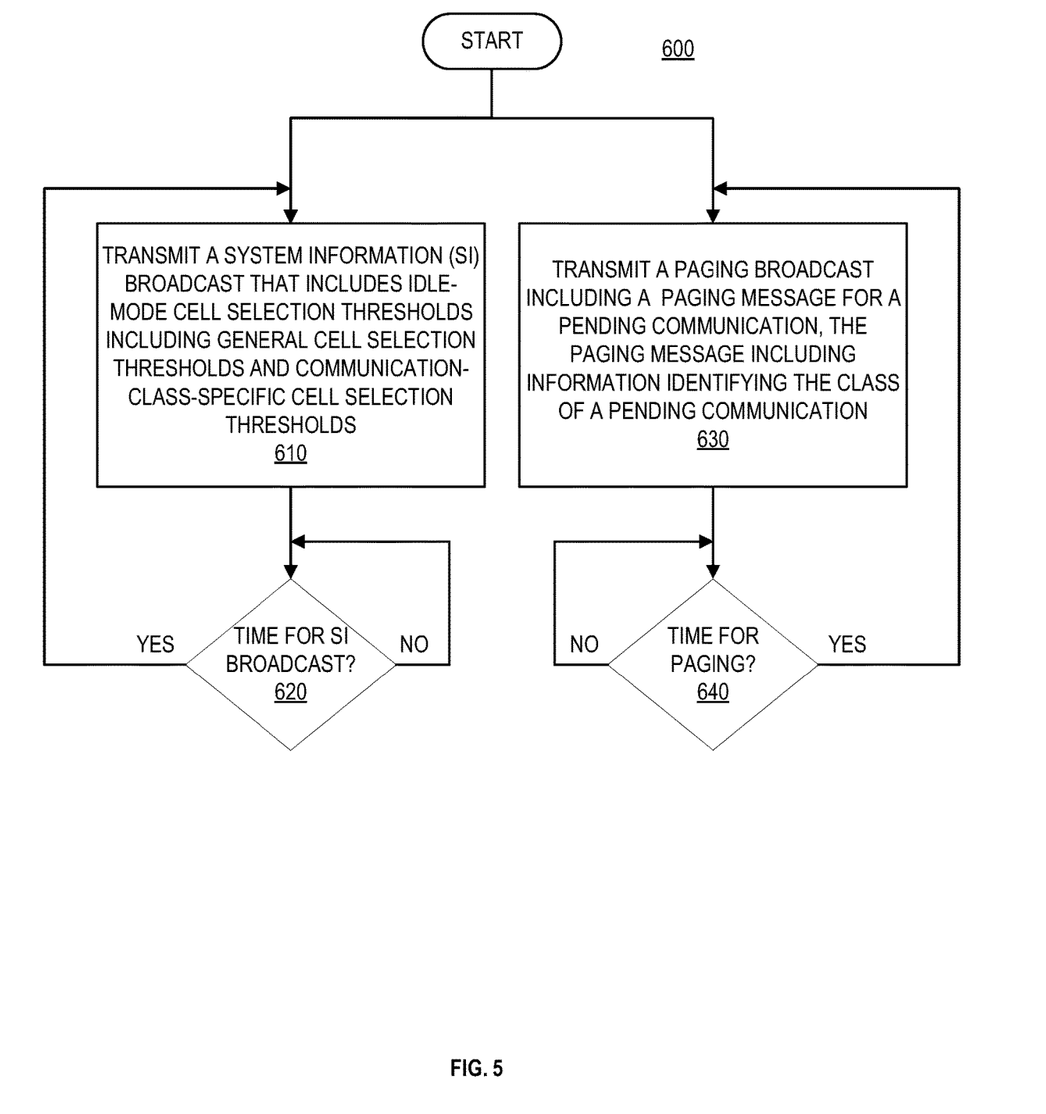
FIG. 5 depicts an example method for communication class aware idle mode cell reselection.

Some examples of the disclosed techniques and methods for communication class aware idle mode cell reselection are discussed further below. FIG. 5 illustrates an example method for communication class aware idle mode cell reselection. Method 600 may be performed by any suitable processing circuitry, such as for example by a processor included in access node 110 or 210, processing node 500, or controller node 104. For discussion purposes, as an example, method 600 is described as being performed by a processor included in access node 110.

Method 600 may include the access node 110 transmitting a system information (SI) broadcast that includes idle-mode cell reselection thresholds, including a set of communication-class-specific cell reselection thresholds (step 610). In addition to the communication-class-specific cell reselection thresholds, the SI broadcast may also include general cell reselection thresholds. In some examples, the communication-class-specific cell reselection thresholds may be analogs to the general cell reselection threshold. In some examples, the SI broadcast may include multiple sets of communication-class-specific cell reselection thresholds, one each for multiple specific communication classes. In some examples, one class of communications that has a set of class-specific cell reselection thresholds associated therewith may be a class that includes voice (e.g., VoLTE) communications.

In some examples, one or more of the communications classes that have special class-specific reselection thresholds may correspond to a class associated with a QoS class identifiers (QCI). For example, a class associated with QCI-1 (i.e., a class including digital voice communications) may be one of the classes that has a set of class-specific cell reselection thresholds associated therewith. In some examples, multiple QCI may have their own distinct sets of class-specific cell reselection thresholds, respectively, and thus may be considered as different classes for purposes of reselection. In some examples, multiple QCI may share the same set of class-specific cell reselection thresholds, and thus these may be considered as being part of the same class for purposes of reselection. In some examples, some QCI might have class-specific cell reselection thresholds, while other QCI do not have any class-specific reselection threshold. In examples in which a QCI has class-specific reselection thresholds, the class-specific reselection thresholds may be referred to as QCI-specific reselection thresholds.

In some examples, the SI broadcast may include system information blocks (SIB) corresponding to one or more LTE SIBs, such as SIB-3, SIB-4, and SIB-5, and the cell reselection thresholds may be included within fields of one or more of these SIBs. In some examples, the general reselection thresholds may include reselection thresholds defined in the LTE standard, such as ThreshServingLow, ThreshXLow, and ThreshXHigh, and a set of communication-class-specific cell reselection thresholds may include class-specific analogs to these general thresholds. Such reselection thresholds may be denoted herein $ThreshServingLow_i$, $ThreshXLow_i$, and $ThreshXHigh_i$, with the index i=0 being used to denote the general reselection thresholds and the index i=n≥1 being used to denote class-specific cell reselection thresholds for an $n^{th}$ class of communications. In examples in which the classes are associated with QCI, the index "i" may also indicate the QCI number (e.g., i=1 for QCI-1, i=2 for QCI-2, and so on). In some examples, the threshold parameter $ThreshXHigh_i$ may be used by the wireless device when considering a target cell that is of a higher priority than a currently selected cell, with the target cell being deemed suitable for selection if the signal strength of the target cell exceeds $ThreshXHigh_i$ (the specific value of ThreshXHigh; that is used depending on the class of the pending communication). In some examples, the thresholds $ThreshServingLow_i$ and $ThreshXLow_i$ may be used by the wireless device when considering a target cell that is of a lower priority than a currently selected cell, with the target cell being deemed suitable for selection if the signal strength of the current cell is less than $ThreshServingLow_i$ and the signal strength of the target cell exceeds $ThreshXLow_i$.

In some examples, the idle mode cell reselection thresholds may also include offsets or other modifications which might be applied during cell reselection. For example, signal strength measurements for various cells may be offset or otherwise modified when applying cell selection criteria, and these offsets or other modifications may also be considered as examples of idle mode cell reselection thresholds. In some examples, the communication class-specific cell reselection thresholds may also include both general and communication class-specific versions of such offsets or modifications.

The SI broadcast may be transmitted repeatedly at specified timings. Thus, method 600 may include the access node 110 waiting for a next timing specified for transmitting another SI broadcast (step 620), and when such timing arrives the method may return to step 610 (YES result of step 620) and another SI broadcast may be sent. In some examples, different parts of the SI broadcast may be transmitted at different timings, and there may be different intervals between transmission of different parts of the SI broadcast. For example, an SIB-1 may be broadcast periodically at a fixed time interval known to the wireless devices, so that the idle-mode wireless devices can know when to wake up to listen for SI broadcasts. Other SIBs may be broadcast at timings which do not necessarily need to be fixed, and such timings can be communicated to the wireless devices in the SIB-1 broadcast.

Method 600 may also include the access node 110 transmitting a paging broadcast (step 630). The paging broadcast includes paging messages (also called paging records) for pending communications (if any) that are directed to idle-mode wireless devices. At least one of the paging messages in at least one paging broadcast includes information identifying the class of the corresponding pending communication. In some examples, at least one of the paging messages in at least one paging broadcast includes information indicating that the corresponding pending communication is a member of a specified class of communications that has class-specific cell reselection thresholds.

The paging broadcasts may be transmitted by an access node 110 periodically to notify idle-mode wireless devices of pending communications. Thus, the method 600 may include waiting for a next timing specified for transmitting a paging broadcast (step 640), and when such timing arrives the method may return to step 630 (YES result of step 640) and another paging broadcast may be sent.

Thus method 600 may enable the idle-mode wireless devices to be made aware of what the class-specific cell reselection thresholds are (via the SI broadcasts) and when they should be used (via the paging broadcasts). In particular, when the paging broadcasts indicate that a communication is of one of the special classes that has class-specific cell reselection thresholds, then the wireless device may know that it should use the corresponding set of class-specific cell reselection thresholds previously communicated to it. For example, if wireless device receives a paging broadcast includes a paging message directed to it having a class identifier "2", then the wireless device may know to use the class-specific cell reselection thresholds associated with class "2" (if any) or to use the general cell reselection thresholds if there are no class-specific cell reselection thresholds associated with class "2." This may enable a wireless device to avoid the wasteful handovers described above.

Figure 6:
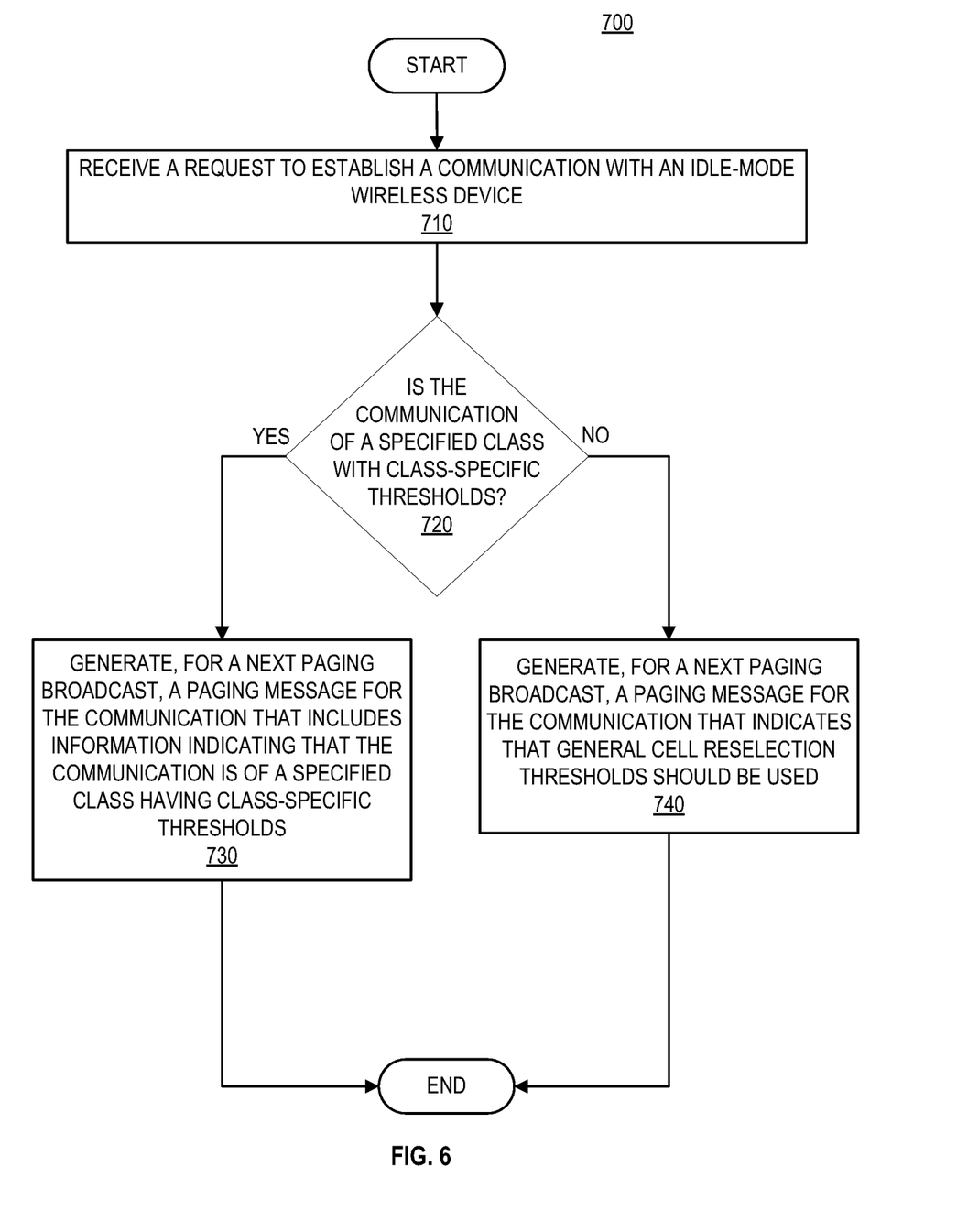
FIG. 6 depicts another example method for communication class aware idle mode cell reselection.

FIG. 6 illustrates another example method for communication class aware cell reselection. Method 700 may be performed by any suitable processing circuitry, such as for example by a processor included in access node 110 or 210, processing node 500, or controller node 104. For discussion purposes, as an example, method 700 is described as being performed by a processor included in access node 110.

Method 700 may include the access node 110 receiving a request (or command) to establish a communication with an idle-mode wireless device 140 (step 710). The request (command) may be received, for example, from the controller node 104, and may be generated in response to an incoming communication (e.g., an incoming voice call) that is directed to the wireless device 140.

Method 700 may further include, in response to receiving the request, determining whether the requested communication is a member of one of the specified classes of communications that have communication-class-specific cell reselection thresholds (step 720). If the communication is a member of one of these specified classes (YES result of step 720), then the method proceeds to step 730. If the communication is not a member of one of these specified classes (NO result of step 720), then the method may proceed to step 740.

In some examples, one or more of the classes having class-specific cell reselection thresholds are associated with one or more QCI, and in such examples in step 720 the access node 110 may determine a QCI associated with the communication (if any) and whether that QCI is associated with one of the particular classes that has class-specific cell reselection thresholds. In some examples, each QCI corresponds to a distinct class of communications and has its own distinct set of class-specific cell reselection thresholds. In some examples, some QCI may correspond to classes having class-specific cell reselection thresholds, while some QCI may not have any class-specific cell reselection thresholds associated therewith. In some examples, more than one QCI may correspond to the same class (for cell reselection purposes), and thus may share the same class-specific cell reselection thresholds.

In some examples, one of the classes having class-specific cell reselection thresholds is a class that includes digital voice (e.g., VoLTE) communications. In such examples, in step 720 the access node 110 may determine whether the pending communication is a digital voice (e.g., VoLTE) call, and if so the access node 110 may determine that the communication is of the particular class having class-specific reselection thresholds.

At step 730 (YES result of step 720), the access node 110 may generate, for the next paging broadcast, a paging message (paging record) for the communication that includes information indicating that the communication is of a specified class that has class-specific cell reselection thresholds. For example, if the communication is associated with QCI-1, and QCI-1 corresponds to a class that has special cell reselection thresholds, then the access node 110 may add an identifier of that class to the paging message. The information indicating that the communication is of a class that has class-specific cell reselection thresholds may be included in a class identifier field of the paging message. For example, each paging message may be structured to include a field for an identity of the wireless device to which the communication is directed and a field for a class of the communication (e.g., a paging type).

At step 740 (NO result of step 720), the access node 110 may generate, for a next paging broadcast, a paging message (paging record) for the communication that indicates to the wireless devices that the general reselection thresholds should be used. For example, a paging message may indicate that the general reselection thresholds should be used by virtue of it not including an identifier of one of the specified classes that have special class-specific cell reselection thresholds. Thus, for example, a paging message that does not identify any classes at all (i.e., the class field in paging message is left blank) would indicate to the wireless devices that the general reselection thresholds should be used. Also, for example, a paging message that identifies a class that is not one of the specified classes, would indicate to the wireless devices that the general reselection thresholds should be used.

Thus, by applying method 700, the paging messages included in the paging broadcasts may provide information to the idle-mode wireless devices that enables them to determine which cell reselection thresholds to use. When a paging broadcast indicates that its corresponding communication is of one of the specified classes, then the wireless device may know that it should use the corresponding set of class-specific cell reselection thresholds. This may enable a wireless device located in a coverage overlap region to avoid a wasteful handover, as described above.

In some embodiments, methods 600 and 700 may include additional steps or operations. Methods 600 and 700 are not mutually exclusive. For example, method 700 may be performed before or concurrently with step 630 (or between successive performances of step 630). Thus, the paging broadcast that is transmitted in step 630 may include the paging message generated in step 730 if a YES result occurs in step 730 or the paging message generated in step 740 if a NO result occurs in step 730. In some circumstances, the method 700 may be performed multiple times for each performance of step 630 (e.g., if multiple communications are received between successive broadcasts), with each performance of the method 700 resulting in a different paging message to be included in the paging broadcast transmitted in step 630.

Figure 7:
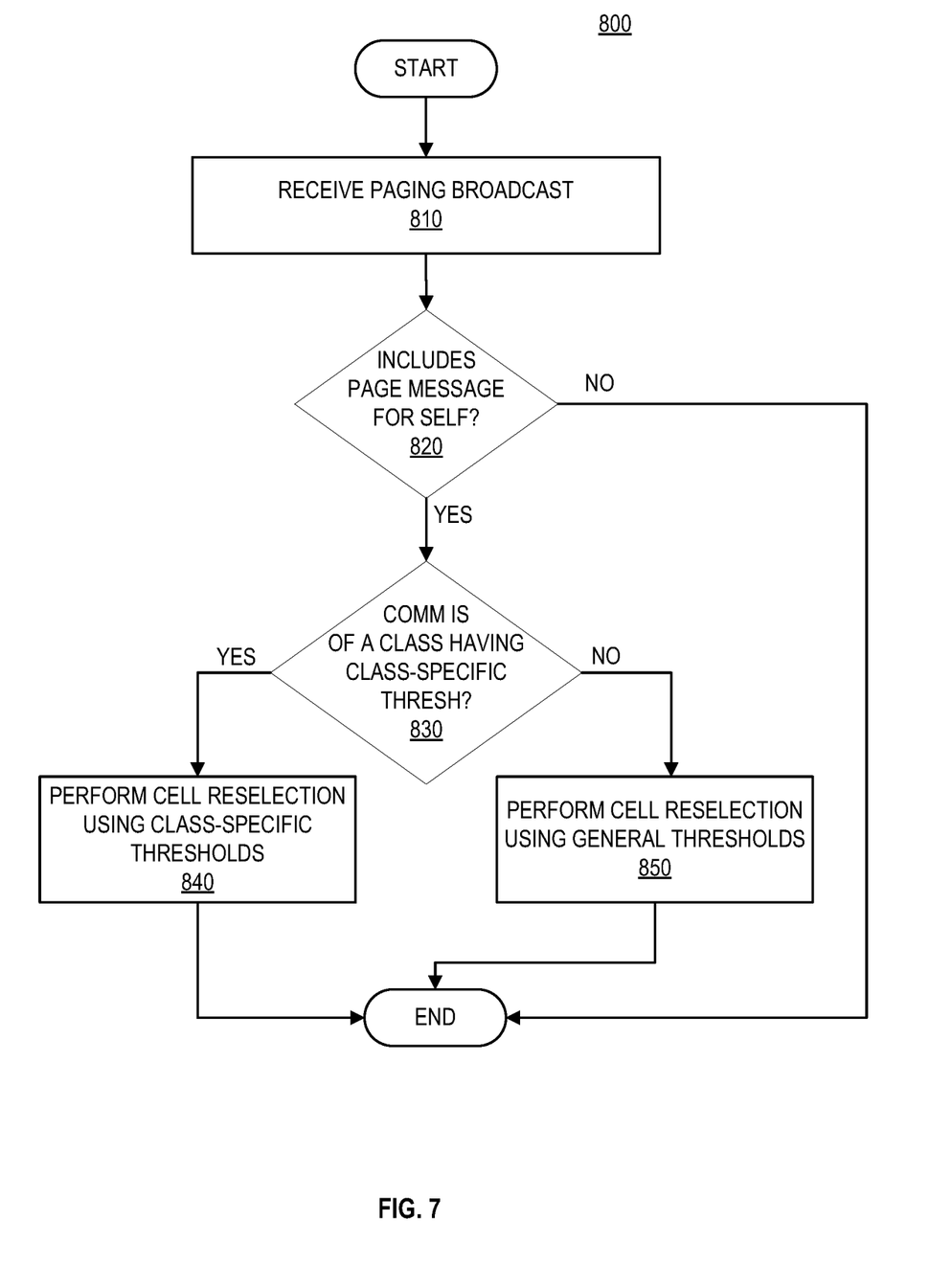
FIG. 7 depicts another example method for communication class aware idle mode cell reselection.

FIG. 7 illustrates another example method for communication class aware cell reselection. Method 800 may be performed by any suitable processing circuitry, such as for example by a processor included in a wireless device, such as wireless device 140.

Method 800 may include an idle-mode wireless device receiving a paging broadcast (step 810). Paging broadcasts may be transmitted at timings that are known to idle-mode wireless devices, and thus idle mode wireless device may know when they should wake up to receive paging broadcasts.

In step 820, the wireless device may determine whether the paging broadcast includes a paging message (paging record) that is directed to itself. This may be determined, for example, by searching the device identifier field of each paging message to see if any identifier listed therein matches the device's own identifier. If so (YES result of step 820), then the method continues to step 830. If not (NO result of step 820), then the method ends.

In step 830, the wireless device may determine, from the paging message, if the pending communication is of one of the classes that has class-specific reselection thresholds. The wireless device may determine that the pending communication is of a class having class-specific reselection thresholds when the paging message includes information identifying such a class, such as an identifier of a class in a class field of the message. The wireless device may know which classes have class-specific cell selection thresholds associated therewith because, for example, the class-specific cell reselection thresholds may have been previously communicated to the wireless device (e.g., in an SI broadcast).

If the communication is of a class that has class-specific reselection thresholds (YES result of step 830), then the method proceeds to step 840. In step 840, the wireless device performs a cell reselection process using a set of class-specific reselection thresholds that correspond to the class of the communication as identified in the paging message. For example, if the paging message indicates a first class (i=1), then the wireless device may apply the thresholds ThreshServingLow$_1$, ThreshXLow$_1$, and ThreshXHigh$_1$.

If the communication is not of a class that has class-specific reselection thresholds (NO result of step 830), then the method proceeds to step 850. In step 850, the wireless device performs a cell reselection process using the general reselection thresholds. For example, if the paging message does not indicate any class, or indicates a class that does not have any class-specific cell selection thresholds, then then the wireless device may apply the general thresholds ThreshServingLow, ThreshXLow, and ThreshXHigh.

In example systems or devices disclosed herein, processing circuitry may be configured to perform some or all of the actions or operations described herein, including but not limited to the actions/operations of the methods 600, 700, and/or 800. In some examples, the processing circuitry is configured to perform such an action/operation by virtue of machine readable instructions corresponding to the action/operation being stored in a non-transitory storage medium that is accessible to a processor of the processing circuitry, such that the processor is capable of executing those instructions during operation. Machine readable instructions correspond to an action/operation if they are of such a nature as to cause the processing circuitry to perform the action/operation when executed by a processor of the processing circuitry. In some examples, the processing circuitry is configured to perform an action/operation by virtue of including dedicated hardware (e.g., ASIC, FPGA, CPLD, logic circuitry) that is capable of performing the action/operation during operation. In some examples, the processing circuitry is configured to perform an action/operation by virtue of a combination of A) the processing circuitry including dedicated hardware to perform some aspects of the action/operation and B) machine readable instructions corresponding to some aspects of the action/operation being stored in a non-transitory storage medium that is accessible to a processor of the processing circuitry.

The example systems and methods described herein may be performed by, or under the control of, a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

Some example configurations of the disclosed embodiments will now be described.

Configuration 1: A system, comprising:
an access node configured to deploy a radio air interface to provide wireless services to one or more wireless devices, the access node comprising:
processing circuitry configured to:
periodically transmit a system information broadcast comprising idle-mode cell reselection thresholds including a set of general cell reselection thresholds and a set of communication-class-specific cell reselection thresholds; and
periodically transmit a paging broadcast including one or more paging messages for pending communications, wherein one of the paging messages includes information identifying a class of the corresponding pending communication.

Configuration 2: The system of any combination of configurations 1 and 3 to 9, wherein each of the paging messages includes a field for identifying a class of the corresponding pending communication.

Configuration 3: The system of any combination of configurations 1, 2, and 4 to 9, wherein the processing circuitry is configured to, for each of the paging messages whose corresponding pending communication is of a first class, include information identifying the first class in the respective paging message, wherein the set of communication-class-specific cell reselection thresholds corresponds to the first class.

Configuration 4. The system of any combination of configurations 1 to 3 and 5 to 9, wherein the set of communication-class-specific cell reselection thresholds are analogous to the set of general cell reselection thresholds.

Configuration 5. The system of any combination of configurations 1 to 4 and 6 to 9, wherein the set of communication-class-specific cell reselection thresholds corresponds to a class associated with a quality-of-service class indicator (QCI).

Configuration 6. The system of any combination of configurations 1 to 5 and 7 to 9, wherein the idle-mode cell reselection thresholds include multiple sets of communication-class-specific cell reselection thresholds corresponding, respectively, to different classes of communications.

Configuration 7. The system of any combination of configurations 1 to 6, 8, and 9, wherein the classes of communications corresponding to the sets of communication-class-specific cell reselection thresholds are respectively associated with quality-of-service class indicators (QCI).

Configuration 8. The system of any combination of configurations 1 to 7 and 9, wherein the set of communication-class-specific cell reselection thresholds corresponds to a class of communications that includes digital voice communications.

Configuration 9. The system of any combination of configurations 1 to 8, wherein the information identifying the class of the pending communication includes a quality-of-service class indicator (QCI) of the pending communication.

Configuration 10. A method, comprising:
periodically transmitting, by an access node configured to deploy a radio air interface to provide wireless services to one or more wireless devices, a system information broadcast that includes idle-mode cell reselection thresholds including general cell reselection thresholds and communication-class-specific cell reselection thresholds; and
periodically transmitting, by the access node, a paging broadcast including one or more paging messages for pending communications, wherein one of the paging messages includes information identifying a class of the corresponding pending communication.

Configuration 11. The method of any combination of configurations 10, and 12-17, wherein each of the paging messages includes a field for identifying a class of the corresponding pending communication.

Configuration 12. The method of any combination of configurations 10, 11, and 13-17, wherein each of the paging messages whose corresponding pending communication is of a class associated with one of the communication-class-specific cell reselection thresholds includes information identifying the class of the corresponding pending communication.

Configuration 13. The method of any combination of configurations 10 to 12 and 14 to 17, wherein the communication-class-specific cell reselection thresholds include analogs of the general cell reselection thresholds.

Configuration 14. The method of any combination of configurations 10 to 13 and 15 to 17, wherein the communication-class-specific cell reselection thresholds include thresholds corresponding to one or more classes associated with one or more quality-of-service class indicators (QCI).

Configuration 15. The method of any combination of configurations 10 to 14, 16, and 17, wherein the communication-class-specific cell reselection thresholds include thresholds corresponding to a class of communications that includes digital-voice communications.

Configuration 16. The method of any combination of configurations 10 to 15 and 17, wherein the information identifying the class of the pending communication includes a quality-of-service class indicator (QCI) of the pending communication.

Configuration 17. The method of any combination of configurations 1 to 16, wherein the idle-mode cell reselection thresholds include multiple sets of communication-class-specific cell reselection thresholds corresponding, respectively, to different classes of communications.

Configuration 18. A processing node configured to perform operations comprising:
periodically transmitting, by an access node configured to deploy a radio air interface to provide wireless services to one or more wireless devices, a system information broadcast comprising idle-mode cell reselection thresholds including general cell reselection thresholds and communication-class-specific cell reselection thresholds;
periodically transmitting, by the access node, a paging broadcast;
receiving a request to establish a communication with an idle-mode wireless device; and
causing one of the paging broadcasts to include a paging message for the requested communication, the paging message including information identifying a class of the requested communication.

Configuration 19. The processing node of any combination of configurations 18, 20, and 21 wherein the communication-class-specific cell reselection thresholds include thresholds corresponding to one or more classes associated with one or more quality-of-service class indicators (QCI).

Configuration 20. The processing node of any combination of configurations 18, 19, and 21, wherein the communication-class-specific cell reselection thresholds include thresholds corresponding to a class of communications that includes digital voice communications.

Configuration 21. The processing node of any combination of configurations 18 to 20, wherein each of the paging messages includes a field for identifying a class of the corresponding pending communication.

Configuration 22. A wireless device configured to perform operations comprising:
receiving, in an idle mode, a system information broadcast from an access node, the system information broadcast comprising idle-mode cell reselection thresholds including general cell reselection thresholds and one or more sets of communication-class-specific cell reselection thresholds; and
receiving, in an idle-mode, a paging broadcast and, responsive to determining that the paging broadcast includes a paging message directed to the wireless device and that the paging message specifies a class corresponding to one of the sets of communication-class-specific cell reselection thresholds, perform cell reselection using the set of communication-class-specific cell reselection thresholds corresponding to the specified class.

Configuration 22. The wireless device of configuration 21, the operations further comprising: responsive to determining that the paging broadcast includes a paging message directed to the processing node and that the paging message does not specify a class corresponding to any of the sets of communication-class-specific cell reselection thresholds, perform cell reselection using the general cell reselection thresholds.

Configuration 23. A method comprising:
receiving, by a wireless device in an idle mode, a system information broadcast from an access node, the system information broadcast comprising idle-mode cell reselection thresholds including general cell reselection thresholds and one or more sets of communication-class-specific cell reselection thresholds; and
receiving, by the wireless device in the idle-mode, a paging broadcast; and
responsive to determining that the paging broadcast includes a paging message directed to the wireless device and that the paging message specifies a class corresponding to one of the sets of communication-class-specific cell reselection thresholds, perform, by the wireless device, cell reselection using the set of communication-class-specific cell reselection thresholds corresponding to the specified class.

Configuration 24. The method of configuration 23, further comprising: responsive to determining that the paging broadcast includes a paging message directed to the processing node and that the paging message does not specify a class corresponding to any of the sets of communication-class-specific cell reselection thresholds, perform, by the wireless device, cell reselection using the general cell reselection thresholds.

Configuration 25. A non-transitory computer readable medium storing processor executable instructions that are configured to, if executed by a processor, cause the processor to perform the method of any combination of configurations 10 to 17.

Configuration 26. A non-transitory computer readable medium storing processor executable instructions that are configured to, if executed by a processor, cause the processor to perform the method of any one of configurations 23 and 24.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication system, comprising:
an access node configured to deploy a radio air interface to provide wireless services including voice-over-LTE (VoLTE),
wherein the access node comprises processing circuitry configured to:
periodically transmit a system information broadcast comprising idle-mode cell reselection thresholds including:
a set of general cell reselection thresholds, and
a set of VoLTE-specific cell reselection thresholds; and
periodically transmit a paging broadcast including one or more paging messages for pending communications for wireless devices connected to the access node, the paging messages indicating whether the corresponding pending communication is a VoLTE communication;
wherein a wireless device connected to the access node is configured to, when in an idle-mode:
in response to the paging broadcast including a paging message indicating there is a pending communication for the wireless device which is not a VoLTE communication, perform cell reselection using the set of general cell reselection thresholds; and
in response to the paging broadcast including a paging message indicating there is a pending communication for the wireless device which is a VoLTE communication, perform cell reselection using the set of VoLTE-specific cell reselection thresholds, wherein the cell reselection using the set of VoLTE-specific cell reselection thresholds comprises selecting a cell that avoids a subsequent cell handover for the VoLTE communication.

2. The system of claim 1, wherein each of the paging messages includes a field for identifying whether the corresponding pending communication is a VoLTE communication.

3. The system of claim 2, wherein the processing circuitry is configured to, for each of the paging messages whose corresponding pending communication is a VoLTE communication, include information in the field of the respective paging message identifying the corresponding pending communication as a VoLTE communication.

4. The system of claim 3, wherein the field of the respective paging message comprises a field for indicating a Quality-of-Service Class Index (QCI), and the information identifying the corresponding pending communication as a VoLTE communication comprises a QCI associated with VoLTE communications.

5. The system of claim 4,
wherein the idle-mode cell reselection thresholds include one or more additional sets of QCI-specific cell reselection thresholds corresponding, respectively, to additional QCI besides the QCI associated with VoLTE, and
wherein the wireless device is configured to, when in an idle-mode, in response to the paging broadcast including a paging message indicating there is a pending communication for the wireless device which is associated with one of the additional QCI, perform cell reselection using the corresponding set of QCI-specific cell reselection thresholds.

6. The system of claim 1, wherein the set of VoLTE-specific cell reselection thresholds are analogous to the set of general cell reselection thresholds.

7. A method, comprising:
periodically transmitting, by an access node configured to deploy a radio air interface to provide wireless services including voice-over-LTE (VoLTE) to one or more wireless devices, a system information broadcast that includes idle-mode cell reselection thresholds including a set of general cell reselection thresholds and a set of VoLTE-specific cell reselection thresholds;
periodically transmitting, by the access node, a paging broadcast including one or more paging messages for pending communications for wireless devices connected to the access node, the paging messages indicating whether the corresponding pending communication is a VoLTE communication;
in response to the paging broadcast including a paging message indicating there is a pending communication for a first wireless device which is not a VoLTE communication, causing the first wireless device to perform cell reselection using the set of general cell reselection thresholds; and
in response to the paging broadcast including a paging message indicating there is a pending communication for a second wireless device which is a VoLTE communication, causing the first wireless device to perform cell reselection using the set of VoLTE-specific cell reselection thresholds, wherein the cell reselection using the set of VoLTE-specific cell reselection thresholds comprises selecting a cell that avoids a subsequent cell handover for the VoLTE communication.

8. The method of claim 7, wherein each of the paging messages includes a field for identifying whether the corresponding pending communication is a VoLTE communication.

9. The method of claim 8, further comprising, for each of the paging messages whose corresponding pending communication is a VoLTE communication, including information in the field of the respective paging message identifying the corresponding pending communication as a VoLTE communication.

10. The method of claim 9, wherein the field of the respective paging message comprises a field for indicating a Quality-of-Service Class Index (QCI), and the information identifying the corresponding pending communication as a VoLTE communication comprises a QCI associated with VoLTE communications.

11. The method of claim 10,
wherein the idle-mode cell reselection thresholds include one or more additional sets of QCI-specific cell reselection thresholds corresponding, respectively, to additional QCI besides the QCI associated with VoLTE, and
wherein the method further comprises, in response to the paging broadcast including a paging message indicating there is a pending communication for a third wireless device which has a given QCI, causing the third wireless device perform cell reselection using the corresponding set of QCI-specific of cell reselection thresholds.

12. The method of claim 7, wherein the set of VoLTE-specific cell reselection thresholds are analogous to the set of general cell reselection thresholds.

13. A non-transitory computer readable medium storing instructions executed by a processor to perform operations comprising:
periodically transmitting, by an access node configured to deploy a radio air interface to provide wireless services including voice-over-LTE (VoLTE) to one or more wireless devices, a system information broadcast that includes idle-mode cell reselection thresholds including a set of general cell reselection thresholds and a set of VoLTE-specific cell reselection thresholds;
periodically transmitting, by the access node, a paging broadcast including one or more paging messages for pending communications for wireless devices connected to the access node, the paging messages indicating whether the corresponding pending communication is a VoLTE communication;
in response to the paging broadcast including a paging message indicating there is a pending communication for a first wireless device which is not a VoLTE communication, causing the first wireless device to perform cell reselection using the set of general cell reselection thresholds; and
in response to the paging broadcast including a paging message indicating there is a pending communication for a second wireless device which is a VoLTE communication, causing the first wireless device to perform cell reselection using the set of VoLTE-specific cell reselection thresholds, wherein the cell reselection using the set of VoLTE-specific cell reselection thresholds comprises selecting a cell that avoids a subsequent cell handover for the VoLTE communication.

14. The non-transitory computer readable medium of claim 13, wherein each of the paging messages includes a field for identifying whether the corresponding pending communication is a VoLTE communication.

15. The non-transitory computer readable medium of claim 14, further comprising, for each of the paging messages whose corresponding pending communication is a VoLTE communication, including information in the field of the respective paging message identifying the corresponding pending communication as a VoLTE communication.

16. The non-transitory computer readable medium of claim 15, wherein the field of the respective paging message comprises a field for indicating a Quality-of-Service Class Index (QCI), and the information identifying the corresponding pending communication as a VoLTE communication comprises a QCI associated with VoLTE communications.

17. The non-transitory computer readable medium of claim 16,
wherein the idle-mode cell reselection thresholds include one or more additional sets of QCI-specific cell reselection thresholds corresponding, respectively, to additional QCI besides the QCI associated with VoLTE, and
wherein the method further comprises, in response to the paging broadcast including a paging message indicating there is a pending communication for a third wireless device which has a given QCI, causing the third wireless device perform cell reselection using the corresponding set of QCI-specific of cell reselection thresholds.

18. The non-transitory computer readable medium of claim 13, wherein the set of VoLTE-specific cell reselection thresholds are analogous to the set of general cell reselection thresholds.

* * * * *